United States Patent
Han

(10) Patent No.: US 7,728,864 B2
(45) Date of Patent: Jun. 1, 2010

(54) RECORDING METHOD FOR OPTICAL DISC DEVICE

(75) Inventor: Cheul Kyung Han, Sungnam-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 304 days.

(21) Appl. No.: 11/411,100

(22) Filed: Apr. 26, 2006

(65) Prior Publication Data

US 2006/0262660 A1    Nov. 23, 2006

(30) Foreign Application Priority Data

Apr. 26, 2005    (KR)    .................... 10-2005-0034306

(51) Int. Cl.
  *B41J 2/47*    (2006.01)
  *G11B 7/00*    (2006.01)
(52) U.S. Cl. ................. 347/251; 369/44.11; 369/44.14; 369/44.25; 369/44.32; 369/44.33; 369/44.39
(58) Field of Classification Search ........................ None
  See application file for complete search history.

(56) References Cited

U.S. PATENT DOCUMENTS

| 5,896,351 | A | * | 4/1999 | Misaizu et al. | ........... 369/30.11 |
| 6,430,120 | B1 | * | 8/2002 | Chritz et al. | ............ 369/30.12 |
| 2004/0001411 | A1 | * | 1/2004 | Morishima | ............... 369/53.28 |
| 2005/0058044 | A1 | | 3/2005 | Koegler, III et al. | |

FOREIGN PATENT DOCUMENTS

JP    2005353219 A  * 12/2005
WO    WO-2006/021897 A1    3/2006

* cited by examiner

*Primary Examiner*—Matthew Luu
*Assistant Examiner*—Kendrick X Liu
(74) *Attorney, Agent, or Firm*—Birch, Stewart, Kolasch & Birch, LLP

(57) ABSTRACT

An optical disc device recording method, which includes determining whether or not a recording process that records information on a label surface of an optical disc has failed, detecting a recording failure position at which the recording process has failed when the determining step determines the recording process has failed, and resuming the recording process from the detected recording failure position.

17 Claims, 6 Drawing Sheets

RECORDING METHOD FOR OPTICAL DISC DEVICE

BACKGROUND OF THE INVENTION

1. Field of the Invention

The present invention relates to a recording method for an optical disc device, and more particularly to a recording method which allows for the resumption of a recording process from a recording failure position on an optical disc such as a LightScribe disc having no tracking guide signal.

2. Description of the Related Art

The LightScribe disc is an optical disc on which not only data can be recorded on a data surface, but also on which a label with a desired design can be printed on a label surface. A layout of the label surface of the LightScribe disc is shown in FIG. 1. As shown in FIG. 1, the label surface includes a label zone, a control feature zone, a clamping/logo zone and a center hole.

Turning now to FIG. 2, which illustrates a Control Feature Outer Ring (CFOR) area located in the control feature zone of the LightScribe disc. In FIG. 2, an index mark indicating the CFOR area and media information such as a media ID are recorded in the CFOR area. As shown, the media ID is separately recorded in three fields which are discretely arranged in the CFOR area.

Further, when the LightScribe disc is inserted into an optical disc device capable of printing labels, the optical disc device locates the CFOR area in the disc by the index mark, reads the media information from the CFOR area, and then performs a requested recording operation (i.e., label printing) on the label surface of the disc.

In addition, regarding the data side of the disc, wobble lands/grooves formed on the disc are used for performing a tracking servo control process during a data recording process, and Absolute Time In Pre-groove (ATIP) information recorded in the wobble lands/grooves is used to detect the current position. The optical disc device performs the tracking servo control process in a feedback fashion using push-pull signals generated from the lands/grooves, locates the current position and gains access to a desired position based on the ATIP information.

However, because wobble lands/grooves are not formed on the label side of the disc, it is not possible to perform a tracking servo control process, nor is it possible to randomly access a portion of the disc. Thus, it is only possible to record a label on the disc sequentially from the inner to outer circular sections in a feedforward fashion.

Accordingly, when a recording or printing process on a label surface fails due to unstable servo control, a disc medium problem, a buffer under run, etc., the recording failure position cannot be located so the label recording process also fails.

SUMMARY OF THE INVENTION

Accordingly, an object of the present invention is to address the above-noted and other problems.

Another object of the present invention is to provide an optical disc recording method that detects a position on the disc where a label recording process has failed and resumes the recording process at the recording failure position.

To achieve these and other advantages and in accordance with the purpose of the present invention, as embodied and broadly described herein, the present invention according to one aspect provides an optical disc recording method including determining whether or not a recording process that records information on a label surface of an optical disc has failed, detecting a recording failure position at which the recording process has failed when the determining step determines the recording process has failed, and resuming the recording process from the detected recording failure position.

According to another aspect, the present invention provides a computer program product on at least one computer readable medium configured to execute computer instructions, including a first computer code configured to determine whether or not a recording process that records information on a label surface of an optical disc has failed, a second computer code configured to detect a recording failure position at which the recording process has failed when the first computer code determines the recording process has failed, and a third computer code configured to resume the recording process from the detected recording failure position.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, wherein.

DETAILED DESCRIPTION OF PREFERRED EMBODIMENTS

Preferred embodiments of a recording method for an optical disc device in accordance with the present invention will now be described in detail with reference to the accompanying drawings.

Figure 1:
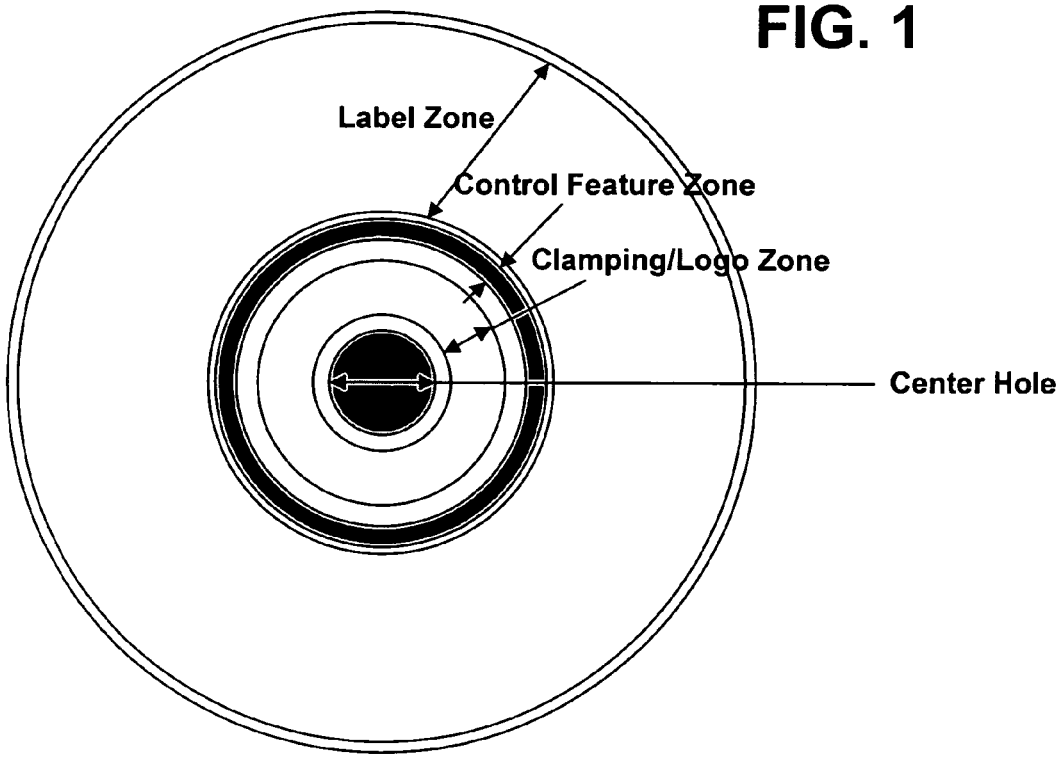
FIG. 1 is a layout of a label surface of a LightScribe disc.
Figure 2:
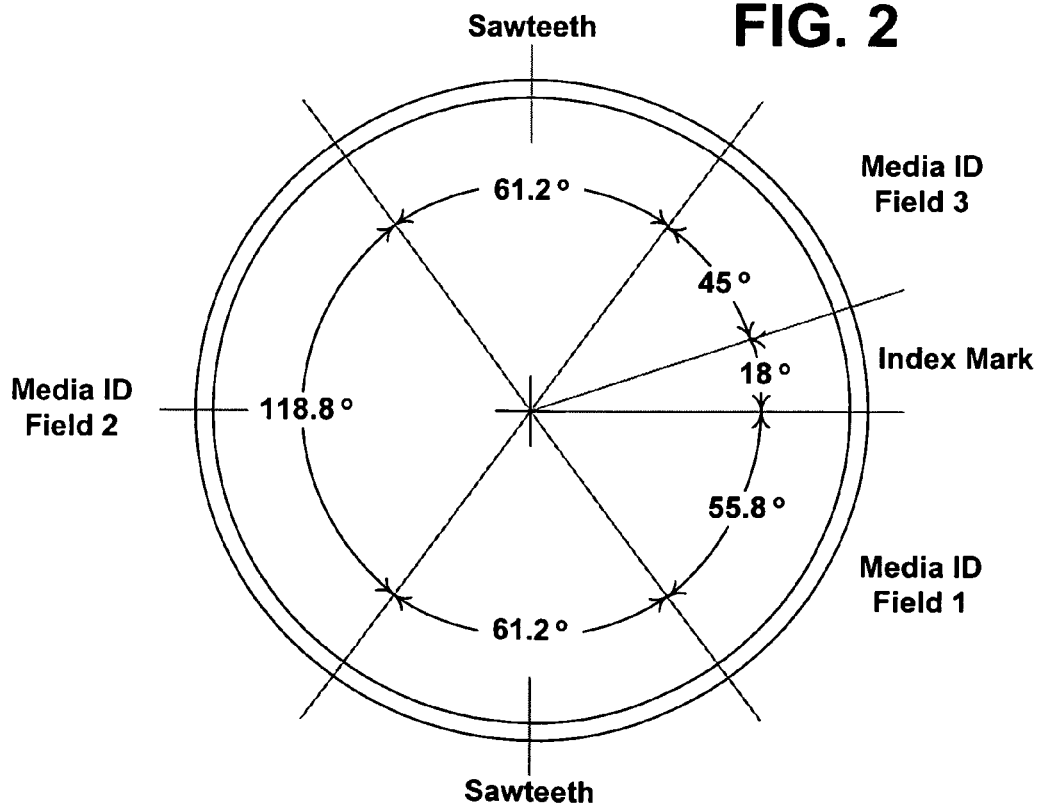
FIG. 2 is an overview of a CFOR area located in a control feature zone of the LightScribe disc.
Figure 3:
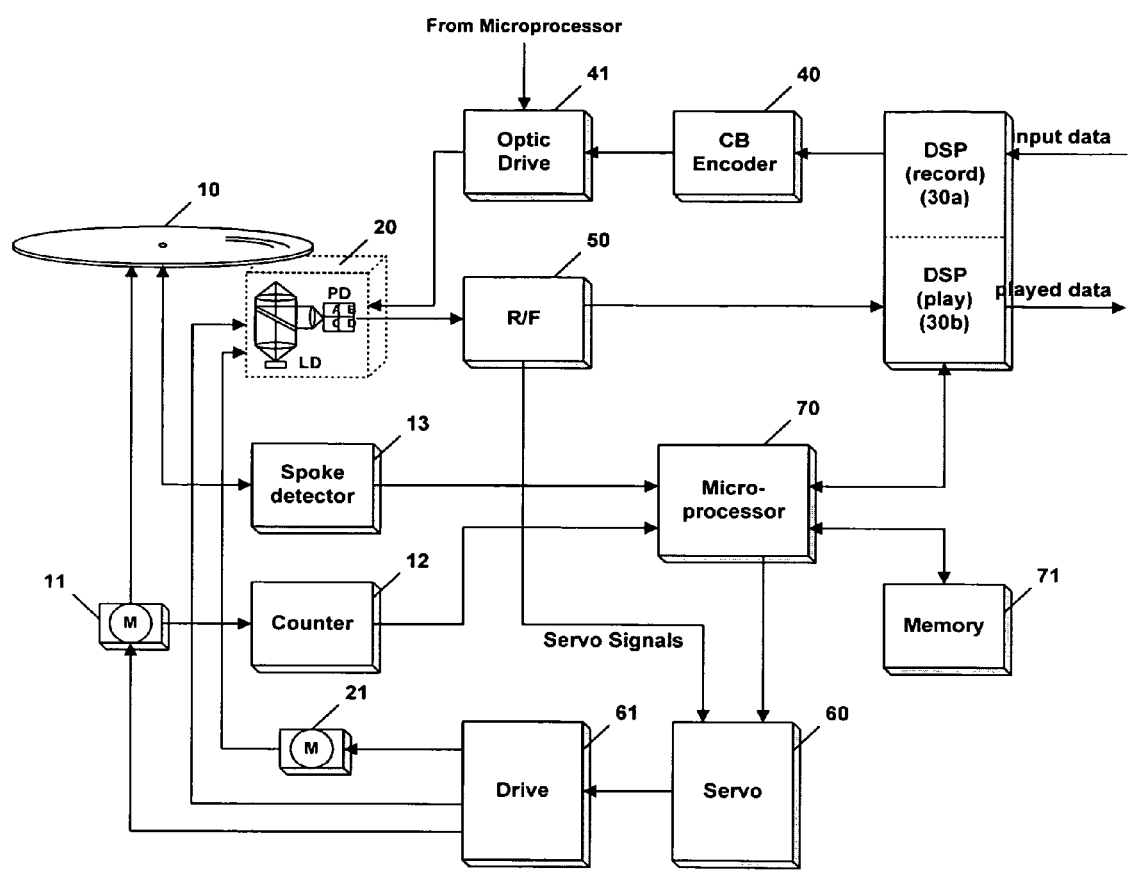
FIG. 3 is a block diagram of an embodiment of an Optical Disc Device (ODD) in which a recording method in accordance with the present invention is implemented.

FIG. 3 is a block diagram of an embodiment of an Optical Disc Device (ODD) in which a recording method in accordance with the present invention is implemented. As shown, the ODD includes an optical pickup 20, a digital recording signal processor 30a, a digital playback signal processor 30b, a channel bit encoder 40, an optical drive 41, an R/F unit 50, a servo unit 60, a drive unit 61, a counter 12, a spoke detector 13, a memory 71, and a microprocessor 70. Also included are a spindle motor 11 and a sled motor 21.

The digital recording signal processor 30a adds an error correction code (ECC) or the like to input digital data to convert the data into a recording format. The channel bit encoder 40 then converts the data into a bitstream. Further, the optical drive 41 outputs a drive signal according to a signal received from the channel bit encoder 40, and the optical pickup 20 records data according to the drive signal on an optical disc 10 and also reads data from a recording surface of the optical disc 10.

Further, the R/F unit 50 performs a filtering and wave shaping process on a signal output from the optical pickup 20 to thereby output a binary signal. The drive unit 61 drives the sled motor 21 to move the optical pickup 20 and the spindle motor M to rotate the optical disc 10. In addition, the counter 12 counts FG pulses produced as the spindle motor 11 rotates, and the spoke detector 13 detects spokes formed on the optical disc 10.

The servo unit 60 controls the operation of the drive unit 61 based on both the rotational speed of the optical disc 10 and a servo signal output from the R/F unit 50. Further, the digital playback signal processor 30b restores original data from the binary signal using its internal clock which is in phase with the binary signal received from the R/F unit 50. In addition, the memory 71 stores a variety of control data and media information, and the microprocessor 70 applies the recording method according to the present invention to perform the recording process on the loaded optical disc 10.

Further, the sled motor 21 may be a step motor such as a craw-pole step motor. This type of step motor operates in a 2-phase excitation scheme and rotates by a desired step according to a combination of polarities of individual phase voltages. For example, one step corresponds to a 1/20 rotation (i.e., rotation of 18°), and if a lead screw having a pitch of 3 mm is provided, the above one step corresponds to a rectilinear movement of 150 μm. In addition, the above-mentioned step motor preferably moves by a predetermined distance of 150 μm (e.g., 90 tracks) for each step (=1 Kick).

In addition, the optical pickup 20 traverses the tracks on the disc. Further, to provide a greater sensitivity, an objective lens included in the pickup 20 is also moved within the pickup 20 via an actuator. For example, the optical unit 20 may move in larger increments, and then within each larger increment or step, the actuator moves the objective lens in smaller increments. Thus, the microprocessor 70 determines the amount of track movement "Xs" of the optical pickup 20 from a driving value of the sled motor 21 and the amount of track movement "Xa" of the objective lens from a driving value of the actuator. The microprocessor 70 also determines a position of a laser beam in the radial direction of the optical disc 10 from the two amounts of track movement Xs and Xa (i.e., the track position=Xs+Xa).

In addition, the microprocessor 70 stores in the memory 71 the amount of track movement of the optical pickup 20 per step (i.e., per kick pulse) and the movement of the objective lens included in the pickup 20 corresponding to a specific driving value of the actuator. Thus, using these stored values, the microprocessor can detect a position on the optical disc 10 in the radial direction at which a recording process has failed (and thus where the recording process is to be resumed).

Figure 4:
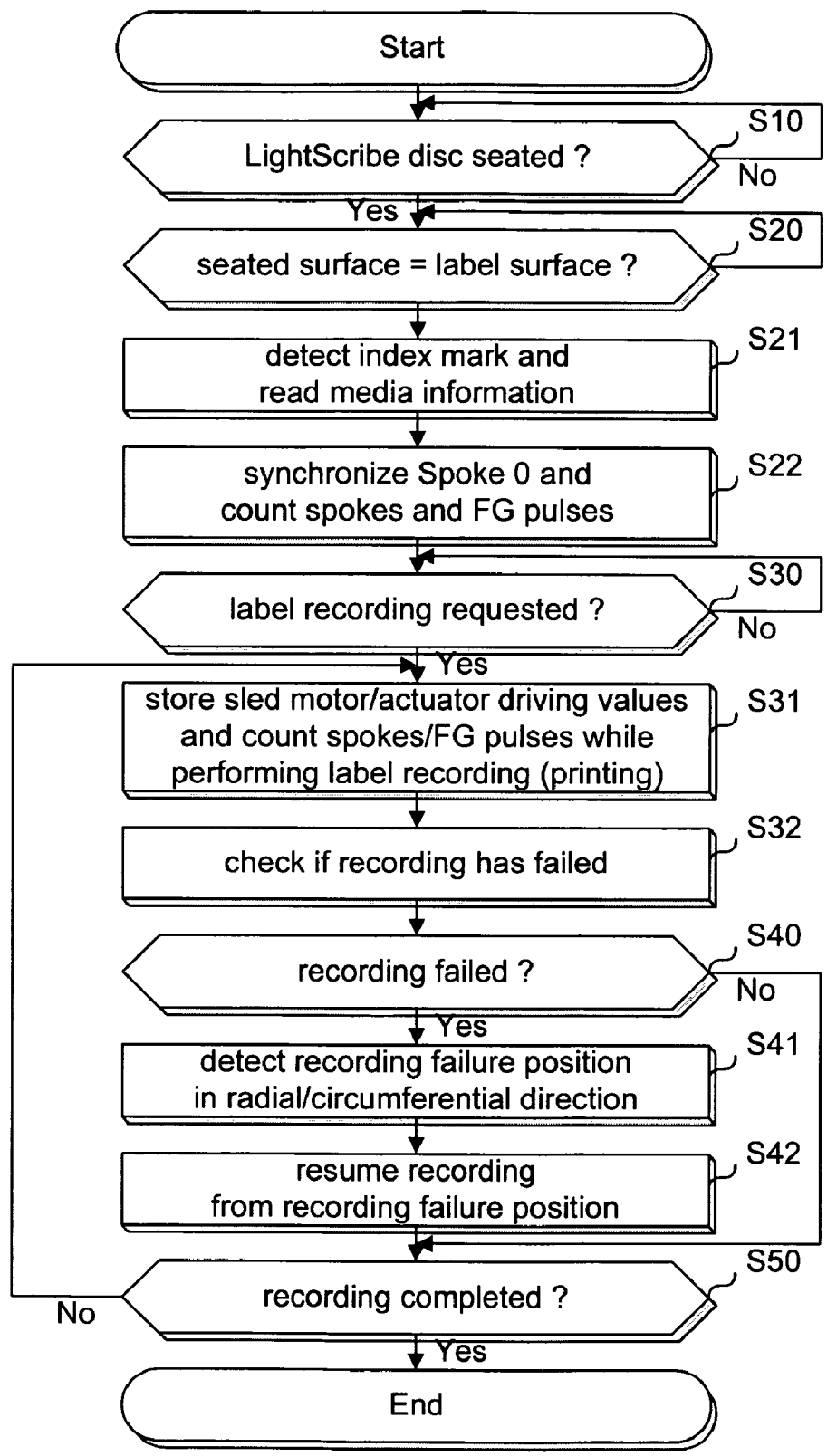
FIG. 4 is a flow chart of an embodiment of a recording method for an optical disc device in accordance with the present invention.

Turning now to FIG. 4, which is a flow chart of an embodiment of a recording method for an optical disc device in accordance with the present invention. The elements in FIG. 3 will also be referred to in this description.

In addition, in this embodiment, the inserted optical disc 10 is assumed to be a LightScribe disc including a label surface whose track cannot be followed during recording because no tracking guide signal is produced. However, other discs may also be used.

As shown in FIG. 4, when the optical disc 10 is seated (Yes in S10), the microprocessor 70 determines whether or not the seated surface of the optical disc 10 is a label surface. If the microprocessor 70 determines the seated surface is a label surface (Yes in S20), the microprocessor 70 moves the objective lens to a control feature zone of the optical disc 10 by applying appropriate driving values to the actuator of the optical pickup 20 and the sled motor 21 through the servo unit 60 and the drive unit 61, respectively.

Figure 5:
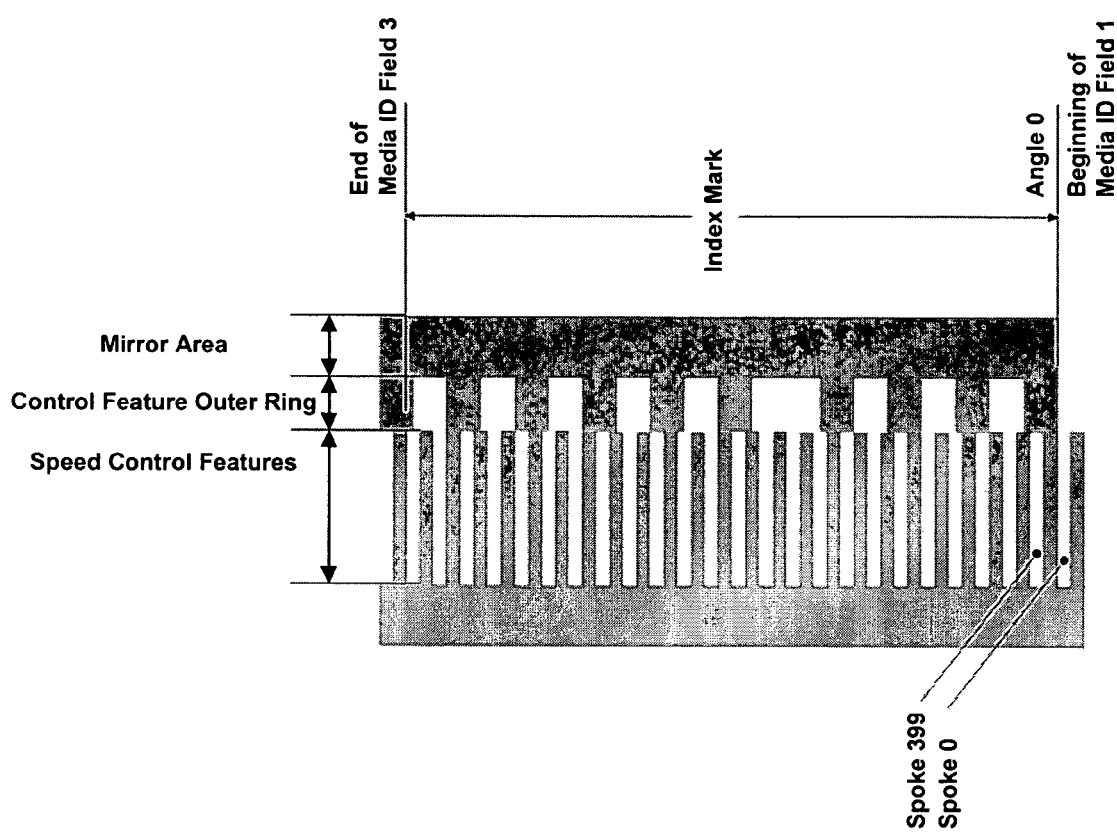
FIG. 5 is an overview illustrating a detailed configuration of a control feature zone and an index mark pattern of the LightScribe disc.

For example, FIG. 5 shows a control feature zone and an index mark pattern of the LightScribe disc. As shown in FIG. 5, the control feature zone includes a speed control features area, a control feature outer ring area and a mirror area. The index mark formed in the CFOR area is provided to make it easy to locate the CFOR area and to synchronize a first spoke (Spoke 0). In addition, the first spoke (Spoke 0) starts at the end position of the index mark, which is a reference position on the disc in the circumferential direction.

Turning again to FIG. 4, the microprocessor 70 detects index mark from the index mark pattern of the CFOR area, synchronizes the Spoke 0 based on this detection, and then reads media information of the CFOR area from the Spoke 0 (S21). The microprocessor 70 also stores the read information in the memory 71 and transmits the read information to a host.

Further, the spoke detector 13 detects the spokes formed on the optical disc 10 when the optical disc 10 rotates, and the microprocessor 70 counts the detected spokes. The microprocessor 70 also synchronizes the Spoke 0, starts counting spokes from this position and increases the spoke count value by one each time a spoke is detected by the spoke detector 13 (S22). In one example, 400 spokes (Spoke 0 to Spoke 399) are formed on the optical disc 10 along the circumferential direction.

In addition, at the end position of the index mark (or at the start of the Spoke 0), the microprocessor 70 controls the counter 12 to count FG pulses produced as the spindle motor 11 rotates (S22). In one example, 20 FG pulses are produced when the optical disc 10 rotates once. The microprocessor 70 also detects a position on the optical disc 10 in the circumferential direction through this count value.

Further, the spoke count value is more accurate than the FG pulse count value. Thus, the microprocessor 70 can approximately detect the position on the optical disc 10 in the circumferential direction from the FG pulse count value, and then accurately detect the position on the optical disc 10 in the circumferential direction from the spoke count value.

In addition, the microprocessor 70 continuously tracks the position on the optical disc 10 in the circumferential direction through the count value (i.e., the spoke count value and/or the FG pulse count value) obtained with reference to the end position of the index mark. When a label printing process is requested (Yes in S30), the microprocessor 70 sets an appropriate recording power and records data transmitted from the host on a label zone of the label surface of the optical disc 10, while appropriately moving the optical pickup 20 and the objective lens by applying appropriate driving values to the step motor and the actuator (S31).

The microprocessor 70 also continuously stores the driving values of the step motor and the actuator (or the amounts of movement of the step motor and the actuator according to the driving values), starting from the initial position of the recording process (e.g., the control feature outer ring area) (S31) When the recording process fails, the stored driving values of the step motor and the actuator are used to detect a position (e.g., a track position) in the radial direction of the optical disc 10 at which the recording process failed.

Further, when the optical disc 10 rotates during the recording process, the microprocessor 70 continuously tracks the position on the optical disc 10 in the circumferential direction based on the count value obtained with reference to the end position of the index mark. Thus, during the recording process, the microprocessor 70 continuously checks whether or not the recording process has failed (S32).

In addition, the optical pickup 20 includes a laser diode, which outputs a laser beam corresponding to a recording power voltage, and a Front Photo Detector (FPD), which detects a laser beam output from the laser diode and outputs a Front Photo Detector Output (FPDO) signal corresponding to the detected laser beam. Further, the microprocessor 70 continuously monitors the FPDO signal during the recording process to check whether or not the recording process has failed.

Figure 6:
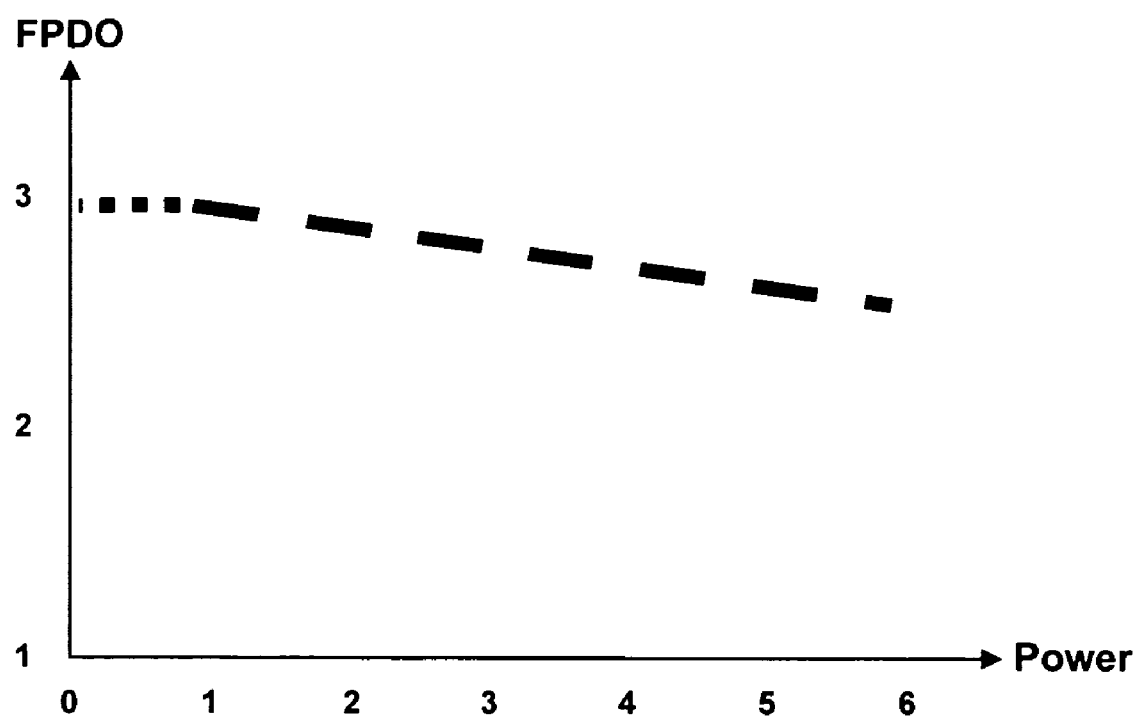
FIG. 6 is a graph showing the relationship between a recording power and an Front Photo Detector Output (FPDO) signal.

Turning next to FIG. 6, which is a graph showing a relationship between the recording power and the FPDO signal. As shown, the FPDO signal is at a predetermined reference level when no laser beam is output. Thus, in this instance, the microprocessor 70 determines the recording process has failed when the FPDO signal is detected at the reference level.

Figure 7:
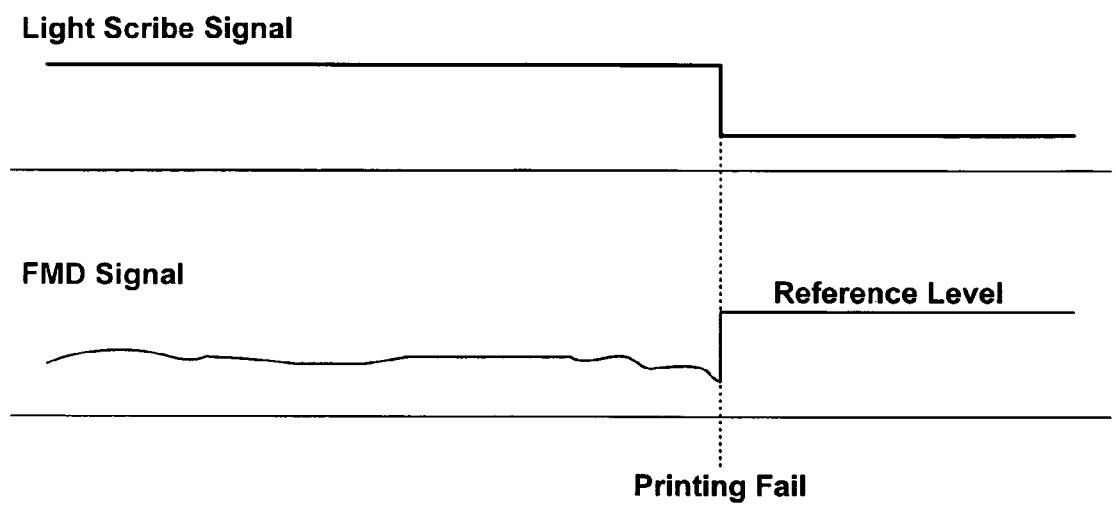
FIG. 7 illustrates a change in an Front Monitor Diode (FMD) signal due to a recording process failure.

Another method of determining when the recording process has failed is to use Front Monitor Diode (FMD) signals. The FMD signals correspond to output voltages (i.e., FMD voltages) of cells A, B, C, and D, for example, of a photodiode provided in the optical pickup 20 when a laser beam having the set recording power is output. As shown in FIG. 7, the FMD signal shifts to a reference level when the recording process fails. Thus, in this instance, the microprocessor 70 determines the recording process has failed when the FMD signal is detected at the reference level.

Returning to FIG. 4, when the microprocessor 70 determines the recording process has failed (Yes in S40), the microprocessor 70 detects the recording failure position. That is, the microprocessor 70 detects both a position on the disc in the radial direction and the circumferential direction at which the recording process has failed. This process is performed in the following manner.

The microprocessor 70 determines the number of driving values (specifically, the accumulated number of steps or kick pulses) applied to the step motor from the initial position of the pickup 20 until the failure of the recording process, and determines the driving value applied to the actuator at the moment when the recording process has failed. Based on the amount of track movement of the optical pickup 20 per step or per kick pulse of the step motor and the amount of track movement of the objective lens corresponding to a specific driving value of the actuator, which have been stored in the memory 71, the microprocessor 70 calculates the amount of movement (Xs) of the optical pickup 20 and the amount of movement (Xa) of the objective lens. The microprocessor 70 then detects the position on the disc in the radial direction (e.g., the track position=Xs+Xa) at which the recording process has failed (S41).

Once the radial position is detected, the microprocessor 70 determines whether or not the optical disc 10 is tilted because the radial position on the optical disc 10 may have a margin of error of a+1 or −1 track depending on the amount of the tilt. The microprocessor 70 also determines whether or not the radial position at which the recording process has failed has been accurately detected by detecting and comparing signal levels of −1 and +1 tracks relative to the detected radial position. This determination is based on the fact that, if the detected radial position is accurate, the −1 track has been printed and the +1 track has not been printed so the signal levels of the −1 and +1 tracks are detected at different levels.

If the microprocessor 70 determines the radial position at which the recording process has failed has not been accurately detected, the microprocessor 70 moves to a position −1 or +1 track away from the detected radial position and detects and compares signal levels of −1 and +1 tracks relative to the moved position to determine whether or not the moved position is the radial position at which the recording process has failed. The microprocessor 70 repeats this process until the radial position is accurately located.

Further, as shown in FIG. 4, the microprocessor 70 also detects a position on the optical disc 10 in the circumferential direction at which the recording process has failed, based on the number of FG pulses and/or spokes, which is counted with reference to the end position of the index mark as the optical disc 10 rotates (S41). In the above described example, 400 spokes are counted and 20 FG pulses are counted when the optical disc 10 rotates once.

Thus, in this example, when the FG pulse count value is 10 and the spoke count value is 200, the microprocessor 70 detects that the circumferential position at which the recording process has failed is a position corresponding to 180 degrees in the rotational direction from the end position of the index mark. When the FG pulse count value is 15 and the spoke count value is 300, the microprocessor 70 detects that the circumferential position at which the recording process has failed is a position (i.e., the end position of the index mark) corresponding to 270 degrees in the rotational direction from the end position of the index mark. Thereafter, the microprocessor 70 resumes the recording process from the detected recording failure position (e.g., from the radial circumferential positions) at which the recording process has failed (S42).

The above embodiment may use another method for detecting the radial position on the optical disc 10, in which the rate of generation (i.e., the frequency) of the FG pulse is used to detect the radial position. In more detail, label printing of the LightScribe disc is performed in a Constant Linear Velocity (CLV) mode. In the CLV mode, the farther away from the center of the optical disc 10, the lower the rotational speed or angular velocity is and the lower the rate of generation of the FG pulse is. Therefore, the microprocessor 70 detects the radial position on the optical disc 10 from the rate of generation or frequency of the FG pulse. Likewise, the rate of detection of the spoke can also be used to detect the radial position.

The microprocessor 70 can also detect the radial position on the optical disc 10 from the number of generated FG pulses from the FG pulse count value. Likewise, the microprocessor 70 can detect the radial position on the optical disc 10 from the number of detected spokes from the spoke count value.

As is apparent from the above description, a recording method for an optical disc in accordance with the present invention makes it possible to accurately detect a position on a label surface of a disc at which a recording process has failed even though the disc provides no tracking guide signals. Thus, the recording process can be resumed from the detected recording failure position, thereby achieving a stable label printing process.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructions.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical disc recording method, comprising:
   determining whether or not a recording process that records information on a label surface of an optical disc has failed;
   detecting a recording failure position at which the recording process has failed when the determining step determines the recording process has failed;
   inwardly and outwardly moving an objective lens to positions a specific number of tracks away from a radial position of the detected recording failure position and confirming signal levels at the positions the specific number of tracks away from the radial position;
   again detecting the radial position of the recording failure position based on the confirmed signal levels; and
   resuming the recording process from the detected recording failure position,
   wherein the detecting of the recording failure position detects the radial position of the recording failure position on a concentric circle of the label surface of the optical disc based on information about a position of an optical pickup measured and stored from an initial position of the recording process until the recording process has failed, and information about a position of the objective lens measured and stored at the moment when the recording process has failed.

2. The method according to claim 1, wherein the determining step determines whether or not the recording process has failed based on at least one from a Front Photo Detector Output (FPDO) signal and a Front Monitor Diode (FMD) signal.

3. The method according to claim 1, wherein the optical disc is a disc that includes separate data and label surfaces.

4. The method according to claim 1, wherein the detecting step calculates the radial position of the recording failure position based on stored driving values of an actuator and a sled motor after an initial position of the recording process.

5. The method according to claim 1, wherein the radial position corresponds to a sum of the position of the optical pickup and the position of the objective lens.

6. The method according to claim 1, wherein the detecting step calculates a radial position of the recording failure position based on stored driving values of an actuator and a sled motor after an initial position of the recording process.

7. The method according to claim 6, wherein the driving value of the sled motor is an accumulation of driving values applied to the sled motor until the recording process has failed after the initial position of the recording process, and the driving value of the actuator is a value of a driving signal applied to the actuator at a position when the recording process has failed.

8. The method according to claim 1, wherein the detecting step determines a radial position of the recording failure position based on at least from a rate at which an FG pulse is generated as the optical disc rotates and a rate at which a spoke is detected as the optical disc rotates.

9. The method according to claim 1, wherein the detecting step determines a radial position of the recording failure position based on at least one from a number of generated FG pulses and a number of detected spokes until the recording process has failed.

10. The method according to claim 1, wherein the detecting step determines a circumferential position of the recording failure position based on at least one from a number of FG pulses and a number of spokes counted from an end position of an index mark of the optical disc.

11. The method according to claim 1, wherein the specific number of tracks is one track.

12. An apparatus for recording information on a recording medium, comprising:
    an optical pickup; and
    a control circuit configured to
        control the optical pickup,
        determine whether or not a recording process that records information on a label surface of an optical disc has failed,
        detect a recording failure position at which the recording process has failed when the recording process has failed,
        inwardly and outwardly move an objective lens to positions a specific number of tracks away from a radial position of the recording failure position,
        confirm signal levels at the positions the specific number of tracks away from the radial position,
        again detect the radial position of the recording failure position based on the confirmed signal levels, and
        resume the recording process from the recording failure position,
    wherein the control circuit is adapted to detect the radial position of the recording failure position on a concentric circle of the label surface of the optical disc based on information about a position of an optical pickup measured and stored from an initial position of the recording process until the recording process has failed, and information about a position of the objective lens measured and stored at the moment when the recording process has failed.

13. The apparatus as recited in claim 12, wherein the controller is configured to determine whether or not the recording process has failed based on at least one from a Front Photo Detector Output (FPDO) signal and a Front Monitor Diode (FMD) signal.

14. The apparatus as recited in claim 12, wherein the optical disc is a disc that includes separate data and label surfaces.

15. The apparatus as recited in claim 12, wherein the controller is configured to calculate a radial position of the recording failure position based on stored driving values of an actuator and a sled motor after an initial position of the recording process.

16. The apparatus as recited in claim 12, wherein the radial position corresponds to a sum of the position of the optical pickup and the position of the objective lens.

17. The apparatus as recited in claim 12, wherein the specific number of tracks is one track.

* * * * *